United States Patent [19]

Chen et al.

[11] Patent Number: 4,948,720

[45] Date of Patent: Aug. 14, 1990

[54] PHOTOGRAPHIC ELEMENT CONTAINING POLYPHOSPHAZENE ANTISTATIC COMPOSITION

[75] Inventors: Janglin Chen, Rochester; Wayne T. Ferrar, Fairport; James E. Kelly, Pittsford; Akemi S. Marshall, Rochester, all of N.Y.

[73] Assignee: Eastman Kodak Company, Rochester, N.Y.

[21] Appl. No.: 295,071

[22] Filed: Jan. 6, 1989

Related U.S. Application Data

[63] Continuation-in-part of Ser. No. 87,480, Aug. 20, 1987, abandoned.

[51] Int. Cl.$^5$ .................................................. G03C 1/94
[52] U.S. Cl. ..................................... 430/527; 430/519; 430/631; 430/667
[58] Field of Search ............... 430/527, 529, 631, 637; 252/1

[56] References Cited

U.S. PATENT DOCUMENTS

| | | | |
|---|---|---|---|
| 3,856,712 | 12/1974 | Reynard et al. | 528/399 |
| 3,888,800 | 6/1975 | Allcock | 528/399 |
| 4,182,835 | 1/1980 | Hergenrother | 528/399 |
| 4,182,836 | 1/1980 | Hergenrother et al. | 528/399 |
| 4,266,016 | 5/1981 | Date et al. | 430/529 |
| 4,272,616 | 6/1981 | Kishimoto | 430/529 |
| 4,558,001 | 12/1985 | Yokayama et al. | 430/527 |
| 4,582,781 | 4/1986 | Chen et al. | 430/527 |
| 4,610,955 | 9/1986 | Chen et al. | 420/527 |

OTHER PUBLICATIONS

Abstract of J6-2286-038-A, Konishiraku Photo KK.
Blonsky, Shriver, Austin & Allcock, J. Am. Chem. Soc. 1984, 106, 6854–6855.
Allcock, Austin, Neenan, Sisko, Blonsky, & Shriver, *Macromolecules*, 1986, 19, 1508–1512.
Blonsky, Shriver, Austin & Allcock, *Solid State Ionics,* 1986 18, 19, 258–264.

*Primary Examiner*—Jack P. Brammer
*Attorney, Agent, or Firm*—Paul L. Marshall

[57] ABSTRACT

The present invention provides a photographic element that includes an antistatic composition comprising a polyphosphazene comprising repeating units of the formula:

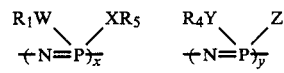

and a salt that complexes with the polyphosphazene. In the above formula, x, y, $R_1$, $R_4$, $R_5$, W, X, Y, and Z are as defined herein.

11 Claims, No Drawings

PHOTOGRAPHIC ELEMENT CONTAINING POLYPHOSPHAZENE ANTISTATIC COMPOSITION

This application is a continuation-in-part of application Ser. No. 087,480, filed Aug. 20, 1987 now abandoned.

FIELD OF THE INVENTION

This invention relates to antistatic compositions and photographic elements containing them. Specifically, this invention relates to antistatic compositions comprising a polyphosphazene, a binder, and a salt, and to photographic elements having antistatic layers comprising such antistatic compositions.

BACKGROUND OF THE INVENTION

Static electricity buildup is common on elements having an electrically insulating support. In photographic elements, radiation-sensitive emulsions are usually coated on an insulating support, rendering the element susceptible to the buildup of static electric charge. This can cause a number of problems. Among the most serious of these is that the discharge of accumulated static charges exposes the radiation-sensitive layer of the element to light, causing marks on the element when developed.

In order to reduce the accumulation of static charge on elements with electrically insulating supports, the support is often coated with a layer containing an antistatic composition that increases electrical conductivity. Alternatively, the antistatic composition can be incorporated into an existing layer of the element. Various materials have been used as antistatic compositions, such as polymers, surface active agents, salts, and combinations thereof. A number of such antistatic compositions exhibit problems, especially when used in photographic elements. For example, they can cause fog or loss of photographic sensitivity. The object of the present invention is to provide antistatic compositions that effectively reduce the accumulation of static charge while exhibiting reduced susceptibility to disadvantages such as those described above.

SUMMARY OF THE INVENTION

The present invention provides a photographic element including an antistatic composition comprising a polyphosphazene comprising repeating units of formula:

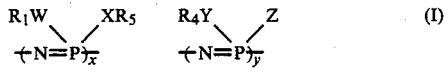

and a salt that complexes with the above-described polyphosphazene. In the above formula, x and y represent molar percentages, with x being 80 to 100%, and y being 0 to 20%. $R_1$ and $R_5$ each independently represent the formula $-(R_2-O)_n-R_3$ where n is 1 to 50 and $R_3$ is substituted or unsubstituted alkyl, substituted or unsubstituted alkenyl, or substituted or unsubstituted aryl. In the repeating unit $-(R_2-O)-$, $R_2$ is randomly alkyl of from 2 to 4 carbon atoms, having from 2 to 4 carbon atoms in the straight chain between oxygen atoms.

W, X, and Y each independently represents $-O-$, $-S-$,

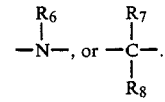

Z represents $-OR_9$, $-SR_{10}$,

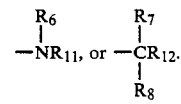

$R_4$, $R_6$, $R_7$, and $R_8$ each independently represents H, substituted or unsubstituted alkyl, substituted or unsubstituted alkenyl, or substituted or unsubstituted aryl. $R_9$ and $R_{10}$ each independently represents substituted or unsubstituted alkyl, substituted or unsubstituted alkenyl, substituted or unsubstituted aryl, or $-(R_{13}-O)_m-R_{14}$. $R_{11}$ and $R_{12}$ each independently represents H, substituted or unsubstituted alkyl, substituted or unsubstituted alkenyl, substituted or unsubstituted aryl, or $-(R_{13}-O)_m-R_{14}$. $R_{13}$ is randomly alkyl of from 2 to 4 carbon atoms, having from 2 to 4 carbon atoms in the straight chain between oxygen atoms. $R_{14}$ is substituted or unsubstituted alkyl, substituted or unsubstituted alkenyl, or substituted or unsubstituted aryl, and m is 0 to 50.

The photographic elements of the invention effectively exhibit effective antistatic properties.

DETAILED DESCRIPTION OF THE INVENTION

Polyphosphazene compounds that are useful in the present invention are those of formula (I). In that formula, x and y represent molar percentages, with x being 80 to 100% and y being 0 to 20%. Preferred values for x are from 90 to 100% and preferred values for y are from 0 to 10%.

$R_1$ and $R_5$ are independently represented by the formula $-(R_2-O)_n-R_3$. Useful compounds according to the invention are those where n is from 1 to 50. Especially preferred values for n are from 2 to 10.

$R_2$ and $R_{13}$ are each independently randomly alkyl of from 2 to 4 carbon atoms and preferably 2 to 3 carbon atoms, having from 2 to 4 carbon atoms and preferably 2 carbon atoms in the straight chain between oxygen atoms. By "randomly alkyl of from 2 to 4 carbon atoms," it is meant that the $R_2$ or $R_{13}$ in each of the repeating units $-(R_2-O)-$ or $-(R_{13}-O)-$ may be different from other $R_2$'s or $R_{13}$'s, as long as each of the $R_2$'s or $R_{13}$'s falls within the overall limitation of being between 2 to 4 carbon atoms, having from 2 to 4 carbon atoms in the straight chain between oxygen atoms. For example, where n=3 and $R_3$ is ethyl, $R_1$ could be $-CH_2CH_2-O-CHCH_3CHCH_3-O-CH_2CHCH_3-O-C_2H_5$. Examples of $R_2$ include ethyl, n-propyl, isopropyl, and n-butyl.

$R_3$ and $R_{14}$ each independently represents (and $R_9$ and $R_{10}$ may each independently represent) substituted or unsubstituted alkyl (preferably of from 1 to 18 carbon atoms and more preferably 1 to 8 carbon atoms), substituted or unsubstituted alkenyl (preferably of from 2 to 18 carbon atoms and more preferably 2 to 8 carbon atoms), or substituted or unsubstituted aryl of from 6 to 18 carbon atoms and more preferably 6 to 10 carbon atoms). Examples of useful substituents include halogen such as F or Cl, amino groups such as $NH_2$, $NHCH_3$, or $N(CH_3)_2$, and thio-containing groups, such as alkylthio (e.g., methylthio, ethylthio) or sulfonate. A preferred substituted $R_3$ is a terminally halogen substituted alkyl group, such as a perfluoroalkyl. Examples of $R_3$ and $R_{14}$ include $-CH_3$, $-CH_2CH_3$, $-CH_2CF_3$, $-CH_2CCl_3$, $-(CH_2)_5CH_3$, $-(CH_2)_4-CH=CH-CH_3$ and $-CH_2-O-CH_3$.

$R_4$, $R_6$, $R_7$, and $R_8$ each independently represents (and $R_{11}$ and $R_{12}$ may each independently represent) H, substituted or unsubstituted alkyl (preferably of from 1 to 18 carbon atoms and more preferably 1 to 8 carbon atoms), substituted or unsubstituted alkenyl (preferably of from 2 to 18 carbon atoms and more preferably 2 to 8 carbon atoms), or substituted or unsubstituted aryl of from 6 to 18 carbon atoms and more preferably 6 to 10 carbon atoms). Examples of substituents include halogen such as F or Cl, amino groups such as $NH_2$, $NHCH_3$, or $N(CH_3)_2$, and thio-containing groups, such as alkylthio (e.g., methylthio, ethylthio) or sulfonate. Examples of $R_4$, $R_6$, $R_7$, $R_8$, $R_{11}$, and $R_{12}$ include $-CH_3$, $-CH_2CH_3$, $-CH_2CF_3$, $-CH_2CCl_3$, $-(CH_2)_5CH_3$, $-(CH_2)_4-CH=CH-CH_3$ and $-CH_2-O-CH_3$.

The molecular weight of the compound of formula (I) is preferably between 2000 and $10^7$, and more preferably between $10^4$ and $10^6$, as determined by the light scattering method.

The salts that are useful in the present invention are those that complex with the compound of formula (I). These salts are well-known in the art as complexing with alkylene oxide-containing compounds such as those described in U.S. Pat. Nos. 4,272,616 and 4,610,955, the disclosures of which are incorporated herein by reference. Whether a salt complexes with the compound of formula (I) can be determined by methods known in the art, such as by electrical conductivity measurements, differential thermal analysis (measuring changes in glass transition temperature), vibrational spectroscopy, and nuclear magnetic resonance, or a combination thereof. Further disclosure on salt complex formation with the compounds of formula (I) is presented in Blonsky, Shriver, Austin, & Allcock, *Solid State Ionics* 1986, 18-19, pp. 258-64.

A number of factors can be utilized to determine whether the salt will be likely to complex with the compound of formula (I). These factors also apply to salt complex formation with alkylene oxide compounds known in the prior art to be useful as photographic antistatic agents. The greater the flexibility of the polymer backbone of the compound of formula (I), the more receptive it is to complexing with all salts. Similarly, the higher the concentration of polar groups in the compound of formula (I), the more receptive it is to complexing with all salts. Salts that have a greater solubility with the compound of formula (I) will tend to complex to a greater extent than salts with lower solubility. Salts with a low lattice energy tend to complex with the compound of formula (I) to a greater extent than salts with a high lattice energy. Salts with bulky anions tend to complex with the compound of formula (I) to a greater extent than salts with smaller anions. Also, salts with lower valence charges (e.g., mono and divalent salts) tend to complex with the compound of formula (I) to a greater extent than salts with greater valence charges (e.g., trivalent salts).

Preferred examples of salts useful in the invention include $KCF_3SO_3$, $Ca(CF_3SO_3)_2$, $Zn(BF_4)_2$, $LiBF_4$, $NaBF_4$, $NaCF_3SO_3$, $LiCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, $C_4F_9SO_3K$, and $KPF_6$. Other examples include $NaB(C_6H_5)_4$, $LiClO_4$, $LiI$, $NaI$, $KI$, $KSCN$, $LiSCN$, and $NaSCN$. One skilled in the art could easily choose a number of additional salts according to the invention, given the salts exemplified above, the factors leading to a likelihood of the salt complexing with the compound of formula (I), and the above-described tests to determine whether the salt complexes with the compound of formula (I).

Although not required (the polyphosphazene can be coated in a layer by itself), the polyphosphazene and salt used in the photographic element of the invention are preferably present in the element along with a binder. The binder can be any of a number of known binders useful in photographic elements. The invention is advantageously utilized with a hydrophilic binder.

Binders useful in the elements of the invention include naturally occurring materials, such as proteins, protein derivatives, cellulose derivatives such as cellulose esters, gelatin such as alkali-treated gelatin or acid-treated gelatin, gelatin derivatives such as acetylated gelatin and phthalated gelatin, polysaccharides such as dextran, gum arabic, zein, casein, pectin, collagen derivatives, collodion, agar-agar, arrowroot, albumin, and the like. All these materials are well-known in the art.

Other binders include colloidal albumin or casein, cellulose compounds such as carboxymethyl cellulose, hydroxyethyl cellulose, etc., and synthetic hydrophilic colloids such as polyvinyl alcohol, poly-N-vinylpyrrolidone, polyacrylic acid copolymers, polyacrylamide or its derivatives or partially hydrolyzed products thereof, and solvent and aqueous applied hydrophobic polymers such as poly(methyl methacrylate) and acrylic latexes. Two or more of these binders may be combined. A preferred binder is gelatin, including lime-treated gelatin, acid-treated gelatin, and enzyme-treated gelatin.

The polyphosphazene of formula (I) can be present in the photographic element of the invention in an amount of from about 1 to 500 $mg/m^2$ and preferably from about 5 to 300 $mg/m^2$. The salt can be present in the photographic element of the invention in an amount of from about 0.5 to 300 $mg/m^2$ and preferably from about 2 to 150 $mg/m^2$. When coated with a binder, the polyphosphazene of formula (I) can be present in the coating composition useful in a photographic element of the invention in an amount of from 1 to 50 weight percent on a dry weight basis and preferably from 5 to 30 weight percent. The salt can be present in the composition of the invention in an amount of from 1 to 20 weight percent on a dry weight basis and preferably from 2 to 10 weight percent. The binder can be present in the antistatic composition useful in the invention in an amount of from 30 to 98% on a dry weight basis.

The composition useful in the present invention can be made by reacting a polydichlorophosphazene with an alkoxide, optionally in the presence of a tetra-n-butyl-ammonium bromide to yield the compound of formula (I). This reaction procedure, including salt complexation, is described in further detail in Journal of the American Chemical Society, 106, 6854-55 (1984) and in Macromolecules, 19, 1508-12 (1986). The polymer-salt complex can then be mixed with a binder to form the composition of the invention.

The composition useful in the invention can be applied to a wide variety of supports to form a wide variety of useful elements with antistatic properties. The support can be, for example, polymeric materials such as poly(ethylene terephthalate), cellulose acetate, polystyrene, poly(methyl methacrylate), and the like. Other supports include glass, paper such as resin-coated paper, metals, fibers including synthetic fibers. Planar supports, such as polymeric films useful in photographic elements, are particularly useful. In addition, the composition of the invention can be coated onto virtually any article where it is desired to decrease resistivity. For example, the compositions can be coated on plastic parts to reduce the unwanted buildup of static electricity. The composition can also be coated on polymeric spheres or other shapes such as those used for electrophotographic toners, and the like.

The antistatic composition useful in the invention can be applied to the support using any of a number of well-known methods. For example, the compositions can be applied by spray coating, fluidized bed coating, dip coating, doctor blade coating, extrusion coating, and other well-known methods of application.

Any type of the photographic element can utilize the above-described antistatic composition, according to the invention. Examples of such photographic elements include color and black and white negative film, color and black and white reversal film, color and black and white paper, x-ray film, film for use in xerographic processes, graphic arts films, diffusion transfer elements, and the like.

Photographic elements of the present invention generally comprise a number of layers. These layers include radiation sensitive layers. Preferred radiation-sensitive layers contain silver halide emulsions. Essentially any known silver halide emulsion may be used, such as silver bromide, silver bromoiodide, silver chloride, silver chlorobromide, and others known in the art. The emulsion may be of any known type, including conventional 3D grains as well as tabular grain emulsions, as known in the art. Other light-sensitive materials include diazo-type compositions, vesicular image-forming compositions, photopolymerizable compositions, electrophotographic compositions including those comprising radiation-sensitive semiconductors, and the like. Sensitizing dyes and color dye-forming couples may be included in the silver halide layers, as described in Research Disclosure, Item 17643, Dec., 1978. Other materials and layers that can be included in photographic elements useful in the invention include filter dyes, gelatin hardeners, coating aids, and the like, as described in the above-identified Research Disclosure.

Layers containing the antistatic composition can be in any position of the photographic element. An advantageous position for the antistatic composition to be coated is in a layer directly on the support, which can have a thin subbing layer as is known in the art. Alternatively, the antistatic layer can be on the same side of the support as the radiation-sensitive materials of the photographic element, with protective layers included as interlayers or overcoats, if desired. An overcoat layer may be particularly advantageous if the antistatic composition does not include therewith a binder.

In some embodiments of the invention, it may be desirable to coat the layer of the antistatic composition with a protective layer. The protective layer may be desirable for a number of reasons. For example, the protective layer can be an abrasion-resistant layer or a layer that provides other desirable physical properties. In many instances, it may be desirable to protect the antistatic composition from conditions that could cause leaching of one of the components of the composition. Where the support to which the antistatic composition is applied also carries a basic layer, it may be desirable to provide a barrier in the form of a protective layer to prevent contact of the antistatic composition by the base. The protective layer is preferably a film-forming polymer that can be applied using known coating techniques. Examples of such film-forming polymers include cellulose acetate, cellulose acetate butyrate, poly(methyl methacrylate), polyesters, polycarbonates, and the like.

The practice of the invention is further illustrated by the following examples.

Materials

Hexachlorocyclotriphosphazene (Tracon Industries) was recrystallized from hexane and sublimed. 2-(2-methoxyethoxy)ethanol, 2-(2-ethoxyethoxy)ethanol and 2,2,2-trifluoroethanol (Kodak) were dried over calcium oxide and distilled. Carbowax ® 350 (Aldrich) was dried azeotropically before use. Tetrahydrofuran (THF) was dried over sodium benzophenone and distilled. Tetra-n-butylammonium bromide (Kodak) was dried in vacuum while being heated with refluxing toluene. Sodium spheres were obtained from MC/B and sodium hydride (50% in oil) was obtained from Baker. Most experimental manipulations were performed under an atmosphere of dry argon. The reactions were typically carried out in a two liter three neck flask fitted with a mechanical stirrer, a reflux condenser with an argon inlet, and an addition funnel. All $^{31}$P chemical shifts were referenced to 80% $H_3PO_4$ at 0 PPM with downfield shifts reported as positive, and the spectra were $^1$H decoupled.

Preparation 1

Poly(dichlorophosphazene)

Poly(dichlorophosphazene) was prepared by the thermal polymerization of hexachlorocyclotriphosphazene $((NPCl_2)_3)$ at 250° C. Polymerization of $(NPCl_2)_3$ was carried out in sealed Pyrex tubes of size 23×3.5 cm (200 g scale). Crushed Pyrex glass (2 g) was added to the tube to facilitate initiation. The tubes were evacuated on a vacuum line for 30 minutes before they were sealed. The sealed tubes were heated at 250° C. until the contents became viscous, about 24 hours. After the tubes had cooled to room temperature, they were placed in a glove bag filled with argon, the Pyrex broken open and the contents placed in a sublimator. The bulk of the starting trimer (50 g) was removed from the polymer during the sublimation (50° C., 16 hours). The remaining polymer was a white material that was highly elastomeric and formed clear viscous solutions in tetrahydrofuran and toluene.

Preparation 2

Poly[bis(2-(2-methoxyethoxy)ethoxy) phosphazene]

A solution of poly(dichlorophosphazene) (33 g, 0.28 mol) in tetrahydrofuran (500 ml) was added over a 3 hour period to a stirred suspension of sodium 2-(2-methoxyethoxy)ethoxide, prepared from sodium hydride (40 g, 0.83 mol) and 2-(2-methoxyethoxy)ethanol (150 g, 1.25 mol) in THF (500 ml). Tetra-n-butylammonium bromide (0.5 g) was added. The reaction was stirred for 48 hours at room temperature and then was refluxed for 1 hour to finish the substitution. The reaction was neutralized with 5% HCl. The reaction mixture was dialyzed against water and freeze-dried. The freeze-dried polymer (60 g) was dissolved in acetone (800 ml) and filtered through a coarse glass frit. It was then precipitated into heptane (4×1500 ml). The polymer was redissolved in acetone and reprecipitated into heptane as before. A $^{31}P\{^1H\}$ NMR spectrum consisted of a sharp singlet at −7.6 PPM, which was indicative of total halogen replacement. Yield was 23%. IR (P=N), 1240 cm$^{-1}$. Intrinsic viscosity was 1.06 dl/g. Low angle laser light scattering gave an apparent weight average molecular weight of 5.4×10$^5$. Elemental analysis (found/theoretical, %): N (5.0/4.9), C (41.8/42.4), H (7.6/7.8), P (11.3/10.9), Cl (<0.3/0.0).

Preparation 3

Poly[(2-(2-methoxyethoxy)ethoxy).9(trifluoroethoxy).1 phosphazene]

A solution of sodium trifluoroethoxide was prepared from sodium spheres (3.1 g, 0.14 g-atoms) and trifluoroethanol (20 ml, 0.26 mol) in THF (150 ml) and added over a 2 hour period to a stirred solution of poly(dichlorophosphazene) (65 g, 0.56 mol) in THF (600 ml). Tetra-n-butylammonium bromide (2.0 g) had been added to the polymer solution previously. A previously prepared solution of sodium 2-(2-methoxyethoxy)ethoxide made from sodium spheres (28 g, 1.2 g-atoms) and 2-(2-methoxyethoxy)ethanol (325 g, 2.7 mol) in THF (500 ml), was subsequently added to the polymer mixture over a 5-hour period. The reaction stirred for 72 hours at room temperature and was then neutralized with 5% HCl. The reaction mixture was poured into a 4 liter separatory funnel and allowed to separate into two layers. The top layer (THF) was collected, the solvent removed on a rotary evaporator and precipitated into large quantities of heptane to yield an amber solid. This material was dialyzed against water for 24 hours and freeze dried. A $^{31}P\{^1H\}$ NMR spectrum consisted of a broad peak between −5 to −9 PPM. IR (P=N), 1240 cm$^{-1}$. Intrinsic viscosity (THF) was 0.57 dl/g.

Preparation 4

[Poly(bis(Carbowax-350)phosphazene]

A solution of poly(dichlorophosphazene) (20.7 g, 0.178 mol) in THF (500 ml) was added over a 2 hour period to a stirred suspension of the sodium salt of Carbowax ® 350 in the presence of tetra-n-butylammonium bromide. The alkoxide solution was prepared from sodium spheres (15.9 g, 0.691 mol) and Carbowax ® 350 (500 g, 1.43 mol). The reaction was stirred for 18 hours at room temperature and then refluxed for 24 hours. The reaction mixture was neutralized with 5% HCl and then dialyzed against water to yield a gel. A $^{31}P\{^1H\}$ spectrum consisted of a large peak at 7 PPM and two small peaks at 4 and 5 PPM. IR (P=N), 1240 cm$^{-1}$. Elemental analysis (found/theoretical, %): N (1.6/1.7), C (49.6/50.2), H (8.4/8.6), P (4.6/3.8) Cl (<0.3/0.0).

Preparation 5

[Poly(bis(2-(2-ethoxyethoxy)ethoxy)phosphazene]

A solution of poly(dichlorophosphazene) (29.6 g, 0.252 mol) in THF (500 ml) was added over a 0.5 hour period to a stirred solution of sodium 2-(2-ethoxyethoxy)ethoxide, prepared from sodium spheres (14.9 g, 0.648 g-atoms) and 2-(2-ethoxyethoxy)ethanol (200 g, 1.49 mol) in THF (500 ml). Tetra-n-butylammonium bromide (1.1 g) was added. The reaction was stirred at room temperature for 72 hours, stirred at reflux for 24 hours, then stirred at room temperature for an additional 24 hours. The reaction mixture was neutralized with 5% HCl. Upon standing, two layers formed. The top layer was dialized in water, which resulted in precipitation of the polymer (100 g). The polymer was dissolved in THF (500 ml) and precipitated into water. A $^{31}P\{^1H\}$ NMR spectrum consisted of a sharp singlet at −6.7 PPM, which was indicative of total halogen replacement. Intrinsic viscosity (THF) was 0.89 dl/g. Low angle laser light scattering gives apparent molecular weight of 6.0×10$^5$. IR (P=N), 1240 cm$^{-1}$. Elemental analysis (found/theoretical, %): N (4.5/4.5), C (46.1/46.3), H (7.9/8.4), P (9.9/9.9), Cl (<0.3/0).

EXAMPLE 1

A radiographic silver bromide emulsion layer was coated on a polyester support at a level of 24 mg/dm$^2$ silver and 28.3 mg/dm$^2$ gelatin. The silver bromide comprised tabular grains of 1.75μ diameter and 0.14μ thickness. The emulsion was spectrally sensitized with anhydro-5,5-dichloro-9-ethyl-3,3-di(3-sulfopropyl)-oxacarbocyanine hydroxide, triethylamine salt. A split-layer protective overcoat was applied over the emulsion layer. The interlayer contained gelatin at 3.2 mg/dm$^2$. The top layer contained gelatin at 3.2 mg/dm$^2$ and a polyphosphazene and salt as indicated in Table I. Surface resistivity was measured with a Keithly picoammeter according to the procedure of ASTM standard D257, at 70° F. and 20% and 50% relative humidity. The results are reported in Table I.

TABLE I

| Polyphosphazene, Level (mg/dm$^2$) | Salt Level (mg/dm$^2$) | Surface Resistivity Ohm/square | |
|---|---|---|---|
| | | 50% RH | 20% RH |
| none | none | 8.3 × 10$^{10}$ | 4.2 × 10$^{13}$ |
| poly[bis(2-(2-methoxyethoxy)-ethoxy)phosphazene], 3.2 | CF$_3$SO$_3$K, 1.1 | 4.0 × 10$^9$ | 2.9 × 10$^{10}$ |
| poly[(2-(2-methoxyethoxy)ethoxy.9 (trifluoroethoxy).1 phosphazene], 3.2 | CF$_3$SO$_3$K, 1.1 | 8.0 × 10$^9$ | 1.2 × 10$^{12}$ |

The results in Table I indicate that the elements of the invention exhibit effective antistatic properties.

For comparison, radiographic elements were prepared as described above, including comparison elements using prior art antistatic compositions of commercially available surface active polyoxyethylenes and salts, as indicated in Table II. Identical elements were exposed when fresh and after conditioning at 120° F. and 50% relative humidity for one week. The elements were exposed through a graduated density scale for 1/50 of a second to a 600 watt quartz halogen light source filtered with a Corning ® C-4010 filter to simulate a green-emitting fluorescent exposure. The elements were then processed in a Kodak X-Omat ® Processor using Kodak X-Omat ® chemicals. Development was for 26 seconds at 35° C., fixing for 21 seconds at 35° C., and washing for 16 seconds at 32° C. D-min was measured with a densitometer. The results are reported in Table II.

TABLE II

|  | Polymer, Level(mg/dm²) | Salt, Level(mg/dm²) | Dmin (fresh) | Dmin (incubated) |
|---|---|---|---|---|
| Control | none | none | 0.10 | 0.12 |
| Invention | poly[bis(2-(2-methoxy-ethoxy)ethoxy)phosphazene], 1.6 | $CF_3SO_3K$, 1.1 | 0.12 | 0.14 |
| Invention | poly[(2-(2-methoxy-ethoxy)ethoxy)$_{.9}$(trifluoroethoxy)$_{.1}$phosphazene], 1.6 | $CF_3SO_3K$, 1.1 | 0.10 | 0.08 |
| Comparison | A, 1.6 | $CF_3SO_3K$, 1.1 | 0.10 | 0.23 |
| Comparison | B, 1.6 | $CF_3SO_3K$, 1.1 | 0.12 | 0.23 |
| Comparison | C, 1.6 | $CF_3SO_3K$, 1.1 | 0.12 | 1.00 |
| Comparison | D, 1.6 | $CF_3SO_3K$, 1.1 | 0.16 | 0.44 |
| Comparison | E, 1.6 | $CF_3SO_3K$, 1.1 | 0.12 | 0.27 |

A: $F(CF_2CF_2)_{3-8}CH_2CH_2O(CH_2CH_2O)_xH$, where x is 10–20, DuPont Zonyl® FSN.
B: Nonylphenoxypoly(oxyethylene)ethanol, sold by Rohm & Haas as Triton® X100
C: A dimethylsiloxane-alkylene oxide copolymer, sold by Union Carbide as Silwet® L7605:

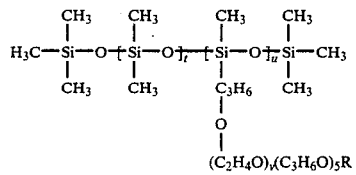

where $t \approx$ to 100, $u \approx$ 2 to 50, $v \approx$ 5 to 50, and $s \approx$ 0 to 50
D: Polyoxyethylene(10)oleyl ether sold by ICI Americas as Brij® 96
E: $HO-(CH_2CH_2O)_x-(CH_2CHCH_3O)_y-(CH_2CH_2O)_{x'}-H$, sold by BASF as Pluronic® L62LF, where $x + x' \approx$ 20 weight percent and $y \approx$ 80 weight percent and mol. wt. $\approx$ 2450.

The results in Table II indicate that photographic elements of the invention offer reduced background density as compared to photographic elements having prior art antistatic compositions such as polyethylene oxide/salt combinations.

Example 2

To measure the antistatic properties of compositions useful in the practice of the invention, coatings of mixtures of gelatin at 100 mg/ft², poly[bis(2-(2-methoxyethoxy)ethoxy)phosphazene] at levels indicated in Table III, and $CF_3SO_3K$ at levels indicated in Table III were made on a polyester support. Surface resistivity was measured as in Example 1.

TABLE III

| Coating | Polyphosphazene Compound mg/ft² | $CF_3SO_3K$ mg/ft² | Surface Resistivity Log, ohm/sq 50% RH | 20% RH |
|---|---|---|---|---|
| 1 (control) | none | none | 14.1 | >15.0 |
| 2 (control) | none | 8.5 | 13.3 | >15.0 |
| 3 (control) | 8.5 | none | 12.9 | 14.3 |
| 4 (control) | 17.0 | none | 12.7 | 14.2 |
| 5 | 8.5 | 8.5 | 10.9 | 11.3 |

The results in Table III indicate significant lowering of surface resistivity by the antistatic composition useful in the invention.

Example 3

Elements were prepared as in Example 2, but on various supports and with other binders at various coverage levels instead of gelatin, and various salts at various coverage levels. Surface resistivities were measured as in Example 1. The results are reported in Table IV.

TABLE IV

| Coating | Support | Polyphosphazene Level (mg/ft²) | Binder, Level (mg/ft²) | Salt, Level (mg/ft²) | Surface Resistivity Log, Ohm/sq 50% FH | 20% RH |
|---|---|---|---|---|---|---|
| 6 (control) | polyester | none | acrylic latex*, 120 | none | >15.0 | 15.0 |
| 7 (control) | polyester | none | acrylic latex*, 120 | $LiBF_4$, 6 | 14.7 | >15.0 |
| 8 (control) | polyester | none | acrylic latex*, 120 | $CF_3SO_3Li$, 6 | 10.4 | 13.3 |
| 9 (control) | polyester | 12 | acrylic latex*, 120 | none | 14.5 | 14.4 |
| 10 | polyester | 12 | acrylic latex*, 120 | $LiBF_4$, 6 | 10.5 | 10.9 |
| 11 | polyester | 12 | acrylic latex*, 120 | $CF_3SO_3Li$, 6 | 9.4 | 10.7 |
| 12 | polyester | 24 | acrylic latex*, 120 | $CF_3SO_3Li$, 6 | 9.1 | 10.0 |
| 13 (control) | cellulose acetate | none | Poly(methyl methacrylate), 60 | none | >15.0 | >15.0 |
| 14 | cellulose acetate | 15 | Poly(methyl methacrylate), 40 | $CF_3SO_3Li$, 5 | 9.9 | 10.2 |
| 15 (control) | polyester | 12 | Hydrolyzed poly(vinyl alcohol), 108 | none | 13.1 | 13.6 |
| 16 | polyester | 11 | Hydrolyzed poly(vinyl alcohol), 98 | $CF_3SO_3Li$, 11 | 11.3 | 11.7 |
| 17 | polyester | 26 | Hydrolyzed poly(vinyl alcohol), 77 | $CF_3SO_3K$, 9 | 10.4 | 11.2 |

TABLE IV-continued

| Coating | Support | Polyphosphazene Level (mg/ft$^2$) | Binder, Level (mg/ft$^2$) | Salt, Level (mg/ft$^2$) | Surface Resistivity Log, Ohm/sq 50% FH | 20% RH |
|---|---|---|---|---|---|---|
| 20 (control) | resin-coextruded paper polyethylene | none | gelatin, 108 | C$_4$F$_9$SO$_3$K, 12 | — | 13.8 |
| 21 | resin-coextruded paper polyethylene | 12 | gelatin, 96 | C$_4$F$_9$SO$_3$K, 12 | — | 11.3 |
| 22 | resin-coextruded paper polyethylene | 12 | gelatin, 102 | C$_4$F$_9$SO$_3$K, 6 | — | 11.6 |
| 23 (control) | cellulose acetate | none | Poly(methyl methacrylate), 60 | none | >15.0 | >15.0 |
| 24 | cellulose acetate | 5 | Poly(methyl methacrylate), 50 | C$_4$F$_9$SO$_3$K, 5 | 11.1 | 11.2 |
| 25 | cellulose acetate | 10 | Poly(methyl methacrylate), 45 | C$_4$F$_9$SO$_3$K, 5 | 10.5 | 10.8 |

*An 80/20 mixture of Rhoplex B88 ® and Rhoplex B60A ®, available from Rohm and Haas The results in Table IV show that antistatic compositions useful in the invention effectively decrease surface resistivity when coated on non-conducting supports.

Example 4

Elements were prepared and tested as in Example 3, but utilizing the polyphosphazene of preparation 3. The results are presented in Table V.

The results in Table V again show that antistatic compositions useful in the invention effectively decrease surface resistivity when coated on non-conducting supports.

Example 5

Elements were prepared and tested as in Example 3, but utilizing the polyphosphazene of Preparation 4. The

TABLE V

| Coating | Support | Polyphosphazene Level (mg/ft$^2$) | Binder, Level (mg/ft$^2$) | Salt, Level (mg/ft$^2$) | Surface Resistivity Log, Ohm/sq 50% RH | 20% RH |
|---|---|---|---|---|---|---|
| 26 (control) | polyester | none | acrylic latex*, 120 | none | >15.0 | >15.0 |
| 27 (control) | polyester | none | acrylic latex*, 120 | LiBF$_4$, 6 | 14.7 | >15.0 |
| 28 (control) | polyester | none | acrylic latex*, 120 | CF$_3$SO$_3$Li, 6 | 10.4 | 13.3 |
| 29 | polyester | 10 | acrylic latex*, 120 | CF$_3$SO$_3$Li, 10 | 9.4 | 11.4 |
| 30 | polyester | 5 | acrylic latex*, 120 | CF$_3$SO$_3$Li, 5 | 10.0 | 11.5 |
| 31 | polyester | 10 | hydrolyzed poly(vinyl alcohol), 100 | CF$_3$SO$_3$K, 10 | 9.9 | 10.5 |
| 32 | polyester | 10 | hydrolyzed poly(vinyl alcohol), 100 | (CF$_3$SO$_3$)$_2$Ca, 10 | 10.3 | 10.7 |
| 33 | polyester | 5 | hydrolyzed poly(vinyl alcohol), 100 | Zn(BF$_4$)$_2$, 5 | 10.9 | 11.3 |
| 34 | polyester | 5 | hydrolyzed poly(vinyl alcohol), 100 | LiBf$_4$, 5 | 10.4 | 11.0 |
| 35 (control) | cellulose acetate | none | poly(methyl methacrylate), 60 | none | >15.0 | >15.0 |
| 36 | cellulose acetate | 15 | poly(methyl methacrylate), 40 | CF$_3$SO$_3$Li, 5 | 9.9 | 10.2 |

*An 80/20 mixture of Rhoplex B88 ® and Rhoplex ®, available from Rohm & Haas results are presented in Table VI.

TABLE VI

| Coating | Support | Polyphosphazene Level (mg/ft$^2$) | Binder, Level (mg/ft$^2$) | Salt, Level (mg/ft$^2$) | Surface Resistivity Log, Ohm/sq 50% RH | 20% RH |
|---|---|---|---|---|---|---|
| 35 (control) | polyester | none | hydrolyzed poly(vinyl alcohol), 120 | none | 14.2 | >15.0 |
| 36 (control) | polyester | none | hydrolyzed poly(vinyl alcohol), 108 | CF$_3$SO$_3$Li, 12 | 12.3 | 14.4 |
| 37 | polyester | 7.8 | hydrolyzed poly(vinyl alcohol), 39 | CF$_3$SO$_3$Li, 3.9 | 9.8 | 10.2 |
| 38 | polyester | 3.9 | hydrolyzed poly(vinyl alcohol), 39 | CF$_3$SO$_3$Li, 3.9 | 9.5 | 10.1 |
| 39 | polyester | 5.7 | hydrolyzed poly(vinyl alcohol), 39 | CF$_3$SO$_3$K, 3.9 | 10.7 | 11.4 |
| 40 | polyester | 10.0 | hydrolyzed poly(vinyl alcohol), 50 | (CF$_3$SO$_3$)$_2$Ca, 5 | 10.3 | 10.7 |

TABLE VI-continued

| Coating | Support | Polyphosphazene Level (mg/ft²) | Binder, Level (mg/ft²) | Salt, Level (mg/ft²) | Surface Resistivity Log, Ohm/sq 50% RH | 20% RH |
|---|---|---|---|---|---|---|
| 41 | polyester | 10.0 | hydrolyzed poly-(vinyl alcohol), 50 | Zn(BF$_4$)$_2$, 5 | 10.4 | 10.9 |

The results in Table VI show that antistatic compositions useful in the invention effectively decrease surface resistivity when coated on non-conducting supports.

Example 6

Elements were prepared and tested as in Example 3, but utilizing the polyphosphazene of Preparation 5. The results are presented in Table VII.

TABLE VII

| Coating | Support | Polyphosphazene Level (mg/ft²) | Binder, Level (mg/ft²) | Salt, Level (mg/ft²) | Surface Resistivity Log, Ohm/sq 50% RH | 20% RH |
|---|---|---|---|---|---|---|
| 42 (control) | cellulose acetate | none | poly(methyl methacrylate), 60 | none | >15.0 | >15.0 |
| 43 (control) | cellulose acetate | 6 | poly(methyl methacrylate), 54 | none | >15.0 | >15.0 |
| 44 (control) | cellulose acetate | none | poly(methyl methacrylate), 54 | CF$_3$SO$_3$K, 6 | >15.0 | >15.0 |
| 45 | cellulose acetate | 5.5 | poly(methyl methacrylate), 49 | CF$_3$SO$_3$K, 5.5 | 11.2 | 11.4 |
| 46 | cellulose acetate | 10 | poly(methyl methacrylate), 45 | CF$_3$SO$_3$K, 5 | 10.8 | 10.9 |
| 47 (control) | cellulose acetate | none | poly(methyl methacrylate), 54 | CF$_3$SO$_3$Li, 6 | >15.0 | >15.0 |
| 48 | cellulose acetate | 5.5 | poly(methyl methacrylate), 49 | CF$_3$SO$_3$Li, 5.5 | 11.5 | 11.9 |
| 49 (control) | cellulose acetate | none | poly(methyl methacrylate), 54 | LiBF$_4$, 6 | >15.0 | >15.0 |
| 50 | cellulose acetate | 5.5 | poly(methyl methacrylate), 49 | LiBF$_4$, 5.5 | 11.5 | 11.8 |

The results in Table VII show that antistatic compositions useful in the present invention effectively decrease surface resistivity when coated on non-conducting supports.

This invention has been described in detail with particular reference to preferred embodiments thereof, but it will be understood that variations and modifications can be effected within the spirit and scope of the invention.

What is claimed is:

1. A photographic element comprising an electrically insulative support having thereon a radiation-sensitive silver halide emulsion layer and an antistatic layer including a polyphosphazene comprising repeating units of the formula:

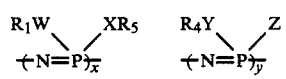

and a salt that complexes with the polyphosphazene, said polyphosphazene salt complex being present in an amount effective as a photographic antistatic agent, wherein x and y represent molar percentages, with x being 80 to 100% and y being 0 to 20%, $R_1$ and $R_5$ each independently represents the formula —(R$_2$—O)$_n$—R$_3$ wherein n is 1 to 50, R$_2$ is randomly alkyl of from 2 to 4 carbon atoms, having from 2 to 4 carbon atoms in the straight chain between oxygen atoms, and R$_3$ is substituted or unsubstituted alkyl, substituted or unsubstituted alkenyl, or substituted or unsubstituted aryl, W, X and Y each independently represents —O—, —S—,

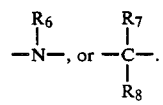

Z represents —OR$_9$, —SR$_{10}$,

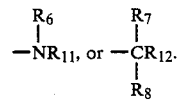

wherein R$_4$, R$_6$, R$_7$, and R$_8$ each independently represents H, substituted or unsubstituted alkyl, substituted or unsubstituted alkenyl, or substituted or unsubstituted aryl, R$_9$ and R$_{10}$ each independently represents substituted or unsubstituted alkyl, substituted or unsubstituted alkenyl, or substituted or unsubstituted aryl, R$_{11}$ and R$_{12}$ each independently represents H, substituted or unsubstituted alkyl, substituted or unsubstituted alkenyl, or substituted or unsubstituted aryl, R$_{13}$ is randomly alkyl of from 2 to 4 carbon atoms, having from 2 to 4 carbon atoms in the straight chain between oxygen atoms, R$_{14}$ is substituted or unsubstituted alkyl, substituted or unsubstituted alkenyl, or substituted or unsubstituted aryl, and m is 0 to 50.

2. A photographic element according to claim 1 wherein R$_2$ and R$_{13}$ each has 2 carbon atoms in the straight chain between oxygen atoms, n is from 2 to 10, and m is from 0 to 10.

3. A photographic element according to claim 2 wherein W, X, and Y each independently represent —O—, and Z represents —$OR_9$.

4. A photographic element according to claim 3 wherein $R_2$ and $R_{13}$ are each ethyl, and $R_3$, $R_4$, and $R_{14}$ are each independently ethyl or perfluoroethyl.

5. A photographic element according to claim 1 wherein the salt is selected from the group consisting of $KCF_3SO_3$, $Ca(CF_3SO_3)_2$, $Zn(BF_4)_2$, $LiBF_4$, $NaBF_4$, $NaCF_3SO_3$, $LiCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, $C_4F_9SO_3K$, and $KPF_6$.

6. A photographic element according to claim 5 wherein said antistatic layer further comprises a hydrophilic binder.

7. A photographic element according to claim 6 wherein the hydrophilic binder is gelatin.

8. A photographic element according to claim 1 wherein said polyphosphazene is poly[bis-2-(methoxyethoxy)-ethoxy]phosphazene.

9. A photographic element according to claim 1 wherein said antistatic layer further comprises a hydrophilic binder.

10. A photographic element according to claim 9 wherein the hydrophilic binder is gelatin.

11. A photographic element according to claim 1 wherein said antistatic layer comprises from about 1 to 500 mg/m² of said polyphosphazene and about 0.5 to 300 mg/m² of said salt.

* * * * *